United States Patent Office 3,132,187
Patented May 5, 1964

3,132,187
PROCESS FOR PREPARING PERYLENE
Melvin N. Turetzky, Stamford, Conn., assignor to General Aniline & Film Corporation, New York, N.Y., a corporation of Delaware
No Drawing. Filed Jan. 27, 1961, Ser. No. 85,207
2 Claims. (Cl. 260—668)

This invention relates to a new and improved method for the preparation of perylene, and relates more specifically to a novel method of preparing perylene by decarboxylation of perylene tetracarboxylic acid.

The processes heretofore proposed for the manufacture of perylene are not adaptable to be carried into practice on a commercial scale due to certain inherent difficulties met with in carrying out the prior processes.

It is one object of this invention to provide an economical process for the preparation of perylene.

A further object of this invention is to provide a process which results in a higher yield of perylene than that heretofore obtained in prior art processes.

Still a further object of this invention is to provide a process for the preparation of perylene in an excellent yield and of such high purity that further purification is not necessary.

More particularly this invention has for its object a process for the preparation of perylene by the decarboxylation of perylene tetracarboxylic acid.

These and other objects will become readily apparent to those skilled in the art from a consideration of the specification and appendant claims.

One of the earliest references to the preparation of perylene occurred in Berichte 38, 3662 (1905), wherein perylene was prepared by internal fusion of 2,2'-dioxy-1,1'-dinaphthyl as follows:

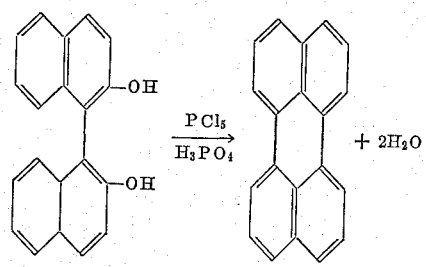

German Patent No. 386,040 and U.S. Patent No. 1,384,615 issued to Hansgirg describe a process whereby dinaphthyl is utilized in preparing perylene. The process described therein not only required temperatures above the boiling point of perylene, that is temperatures of between 500° C.–600° C., for its success but also required purification of the product before a yield of about 50% pure perylene could be obtained. The yield of pure perylene obtained in this prior art method, i.e., about 50% pure product, is not of sufficient proportion to make the process commercially feasible.

U.S. Patent No. 1,454,204 discloses a method for the preparation of perylene by mixing dioxyperylene with a metal such as, for example, zinc dust, heating the mixture to a temperature above the boiling temperature of perylene, whereby perylene is distilled off as a reddish-yellow oil which readily solidifies. By recrystallization with known solvents, e.g., benzene or glacial acetic acid, the perylene product may be purified. This method also requires a high temperature and purification of the product before pure perylene is obtained.

Perylene has also been produced by the reaction of zinc dust, reduced iron and the like with dihydroxylated compounds of alpha-dinaphthyl or suitable derivative thereof, e.g., phosphoric esters. The reaction mixture is heated with or without water and hydrocarbons rich in perylene distill over. The reaction may take place in vacuo, or a current of inert gases may be employed. By this process while pure perylene is obtained by fractional distillation or fractional crystallization from a suitable solution, the yield is quite low, making this process commercially unsatisfactory.

Another proposed process for the preparation of perylene differs from the aforementioned process by the employment of phosphorous esters instead of phosphoric esters, and by the absence of such materials as zinc, has likewise not found commercial success or application due to the low yield of pure perylene obtained therefrom. In this latter process a further purification step is always necessary to obtain a pure perylene product.

According to this invention perylene is obtained by the decarboxylation of perylene tetracarboxylic acid, by a process wherein dry perylene tetrachrboxylic acid and dry soda lime, the latter in the form of an equal weight mixture of sodium hydroxide and calcium oxide, are mixed together and heated to a temperature range of about 350–400° C. Under sub-atmospheric pressure conditions in the range of from about 1 to about 3 mm. mercury whereby perylene product is obtained as an effluent vapor, the resulting perylene vapor is condensed, and a yield of 85 to 90 percent pure perylene is obtained. The purity of the perylene obtained by this process was determined by comparing the melting point of this product with that reported in the vapor art for pure perylene. It was found that the product of the process of this invention had a melting point of 278° C. as compared to 274° C. reported in the prior art. Moreover, the melting of the perylene obtained in the process of this invention is from 277° C. to 278° C., i.e., melting point range of one degree. This is also indicative of the excellent purity of the perylene obtained.

The purity of the perylene product obtained by the process of this invention is further illustrated by comparing its absorption spectra curve with that reported in the literature, that is, the curve given in Berichte 65, 846 (1932) by E. Clar for perylene in alcohol.

The curve for the perylene obtained by the process of this invention showed a peak of maximum absorption at a 256 millimicron wave length and smaller peaks at 367 and 387 millimicron wave lengths. The curve by Clar shows a maximum absorption at a 252 millimicron wave length and smaller peaks at 369 and 387 millimicron wave lengths.

The advantage of being able to prepare a high yield of pure perylene by decarboxylating directly from a dry mix of perylene tetracarboxylic acid and soda lime, with no intermediate preparation of a salt of the acid, makes this invention economical and commercially adaptable for the preparation of perylene.

The preparation of perylene according to this invention is further explained, but not limited by the following examples.

Example I

Mix 57 parts by weight of dry perylene tetracarboxylic acid with 113 parts by weight of dry soda lime, heat the resulting mixture in a vacuum sublimer at a temperature of from about 350 to 400° C. at 1 to 3 mm. pressure whereby an 88 percent yield of pure perylene based on the anhydride is obtained.

Example II

Mix 57 parts by weight of dry perylene tetracarboxylic acid with 113 parts by weight of dry soda lime, heat the resulting mixture in a vacuum sublimer at a temperature of about 375° C. at 1 to 3 mm. pressure whereby an 88 percent yield of pure perylene based on the anhydride is obtained.

Example III

Mix 57 parts by weight of dry perylene tetracarboxylic acid with 113 parts by weight of dry soda lime, heat the resulting mixture in a vacuum sublimer at a temperature of about 400° C. at 1 to 3 mm. pressure whereby an 88 percent yield of pure perylene based on the anhydride is obtained.

Example IV

Mix 57 parts by weight of dry perylene carboxylic acid with 113 parts by weight of dry soda lime, heat the resulting mixture in a vacuum sublimer at a temperature of from about 350 to 400° C. at 1 to 3 mm. pressure whereby an 88 percent yield of pure perylene based on the anhydride is obtained.

Modifications and advantages within the scope of this invention will be apparent to those skilled in the art from the above disclosure.

What is claimed is:

1. A process for the preparation of perylene which comprises the steps of mixing dry perylene tetracarboxylic acid and dry soda lime, heating said dry mixture at a temperature in the range of from 350° to about 400° C. under sub-atmospheric pressure conditions in the range of from about 1 to about 3 mm. mercury to provide perpylene effluent vapor and condensing said vapor whereby perylene having a relatively high purity is obtained.

2. The process for the preparation of perylene according to claim 1 wherein said soda lime is an equal weight mixture of sodium hydroxide and calcium oxide.

References Cited in the file of this patent

Fieser and Fieser: "Organic Chemistry," published by D. C. Heath and Co., Boston (1944), pages 41 and 548 relied on.